United States Patent Office 2,826,132
Patented Mar. 11, 1958

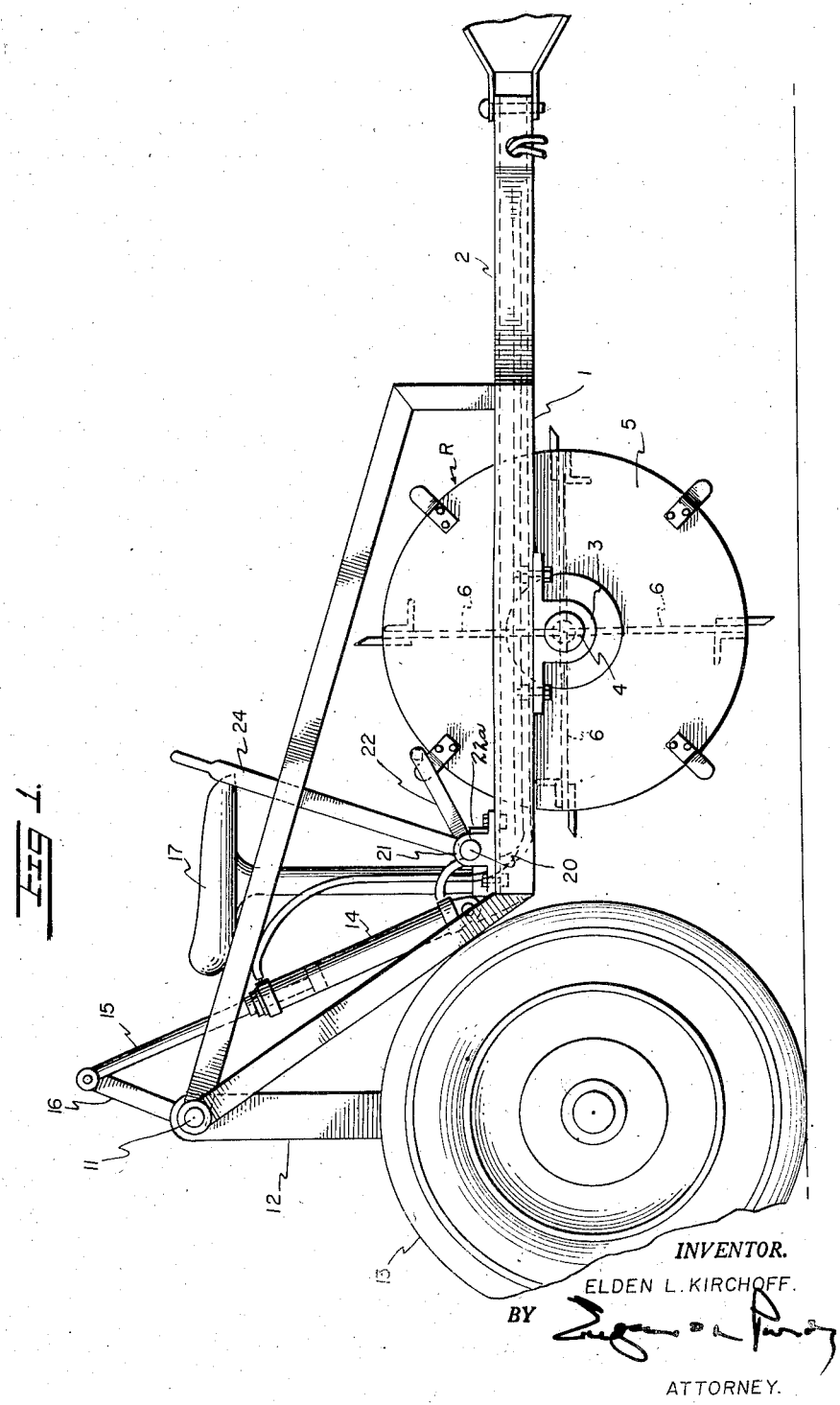

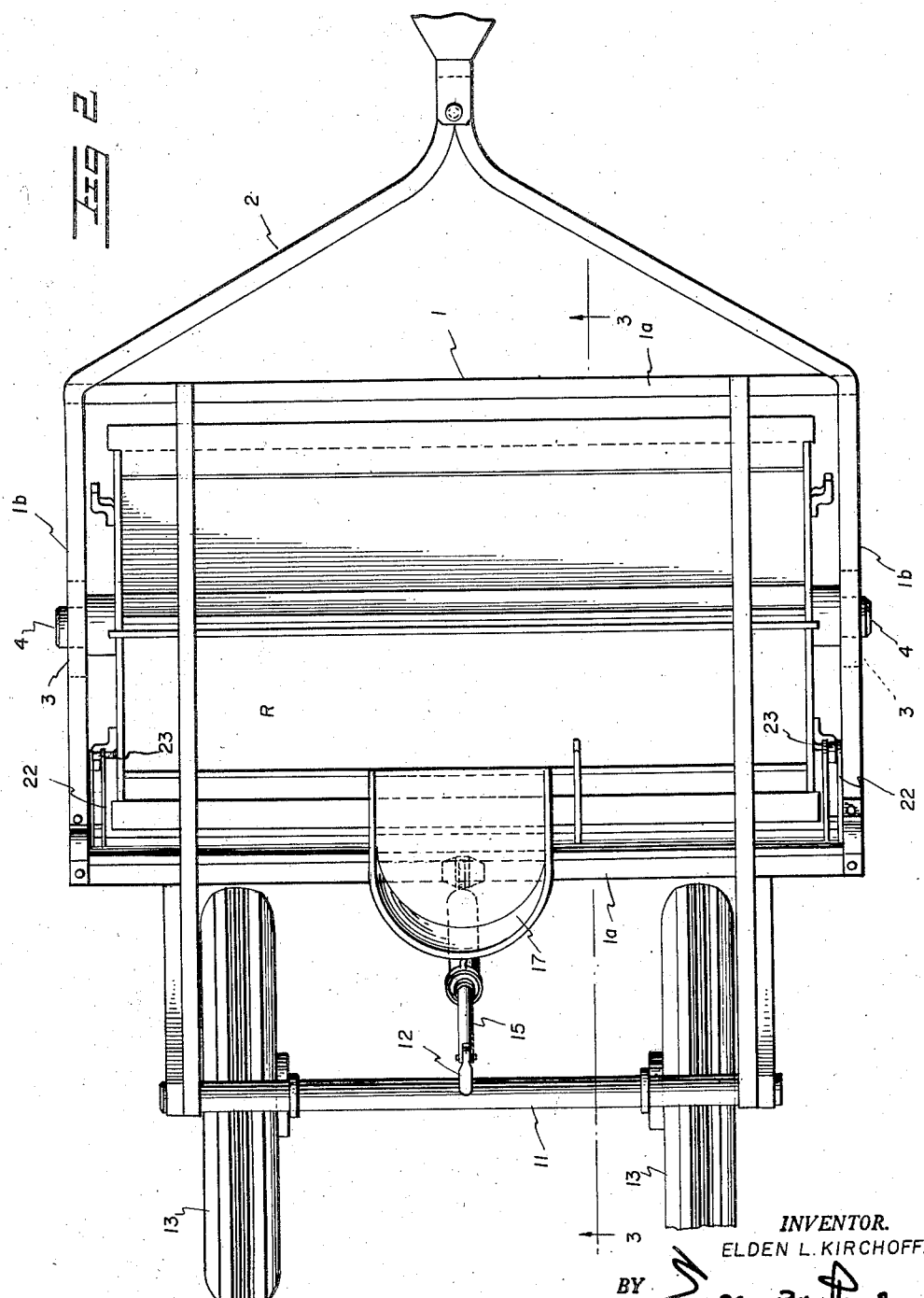

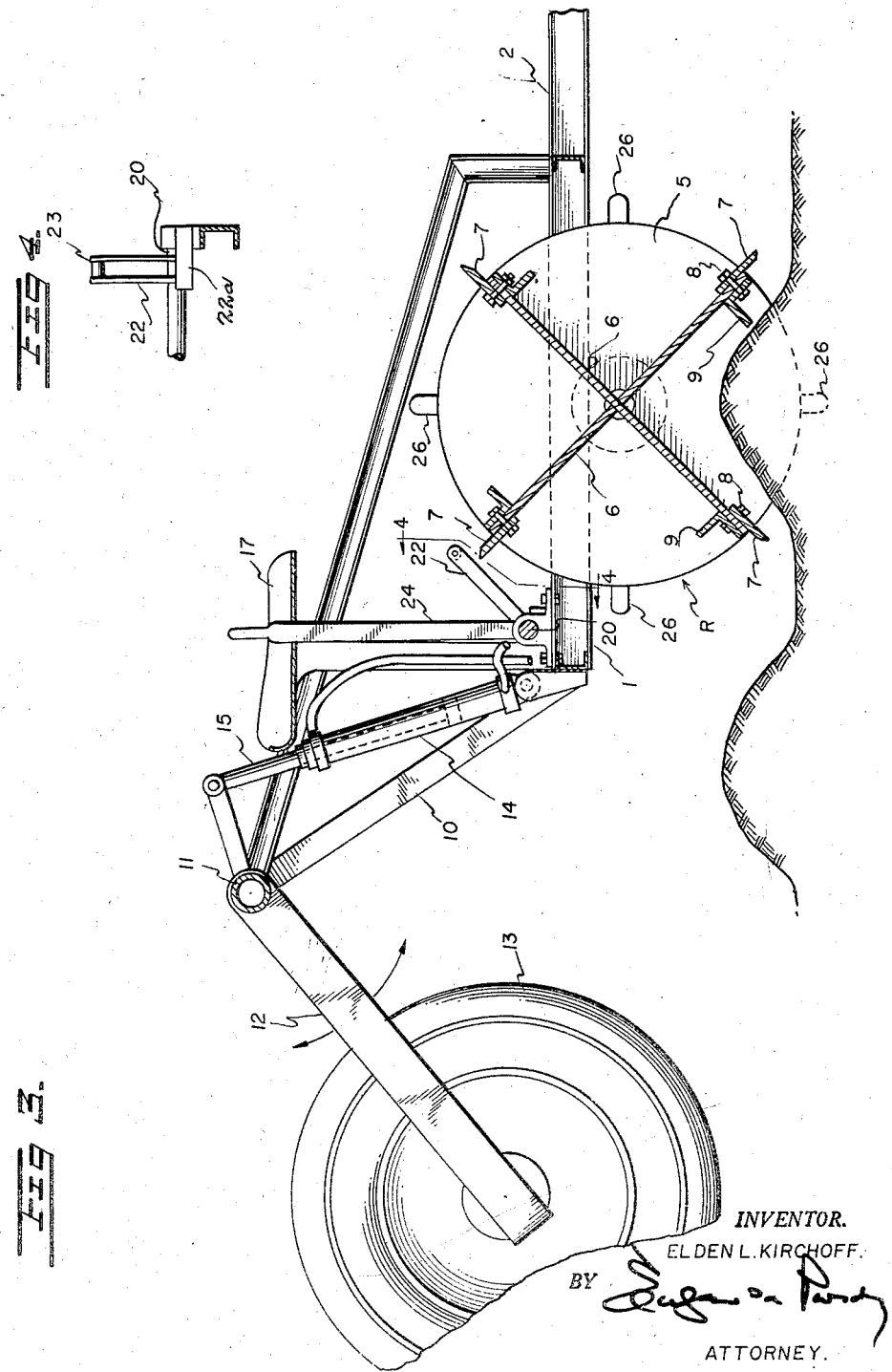

2,826,132

FURROWING AND RIDGING MACHINE

Elden L. Kirchoff, Mesa, Ariz.

Application July 9, 1953, Serial No. 366,940

1 Claim. (Cl. 97—55)

This invention relates to machines that are especially suitable for use in connection with irrigation farming. More particularly the invention has for an object to provide a furrowing and ridging machine adapted to supplement the work of the usual cultivators for forming irrigation channels upon the stretches of ground bounding the edges of the irrigation ditches such as cannot conveniently be reached by the cultivators.

In preparing a field for irrigation it is common practice for the farmer to run a cultivator, equipped with V-shaped shovels, back and forth across the field, following the furrows between adjacent rows of plants and throwing up mounds of dirt upon opposite sides of the rows. The series of furrows lie generally at right-angles to the irrigation ditch that extends across the upper or higher end of the field, and the cultivator is usually mounted upon the rear of a power-operated tractor. When the front of the tractor reaches the irrigation ditch the cultivator upon the rear of the tractor may be located possibly ten or twelve feet away from the ditch, depending upon the length of the tractor. In order that the irrigation channels may reach close up to the bank of the irrigation ditch, from which water is delivered into the channels, it has heretofore been necessary to complete the channels either manually by hand shovel or by raising the shovels of the tractor, backing the tractor up to the edge of the irrigation ditch, then lowering the shovels and starting the travel of the tractor in the opposite direction. In either case, the extension of the irrigation channels to the edge of the irrigation ditch is laborious and time consuming.

The furrowing and ridging machine of my invention is so constructed and arranged as to facilitate the forming of these connecting or feeder channels in a quick and efficient manner and with a minimum amount of labor. After the irrigation channels have been formed by the cultivator in the usual manner, the furrowing and ridging machine is caused to travel over the stretch of unchanneled ground adjacent the edge of the irrigation ditch in a path, or paths, generally paralleling the ditch and to successively produce furrows and ridges of earth contiguous to those produced by the plows of the cultivator. In this way the channels formed by the furrowing and ridging machine form extensions of the channels previously produced by the cultivator to provide a series of parallel, uninterrupted channels extending up to the edge of the irrigation ditch into which water is siphoned out of the ditch for distribution to the field under cultivation.

More particularly, the furrowing and ridging machine of my invention comprises a rotor having four or more radially-disposed, ground-engaging web plates together with means under the control of the operator for locking the rotor against rotation with one of the web plates disposed perpendicularly to the ground. Thus, during the travel of the machine over the ground, the rotor may be periodically locked to cause one of the web plates to function as a scraper for piling up loose earth, and subsequently released to dump the earth in the form of a ridge or mound defining an extension of one side of an irrigation channel.

Other objects and advantages of the invention will be apparent from the following detailed description of a preferred embodiment thereof, reference being made to the accompanying drawings in which:

Figure 1 is a side view of a furrowing and ridging machine;

Figure 2 is a plan view of the machine of Fig. 1;

Figure 3 is a longitudinal cross-sectional view of the machine taken on the line 3—3 of Fig. 2; and Figure 4 is a detail view illustrating the trip arms and roller for locking the rotor against rotation.

The furrowing and ridging machine as shown in the drawings comprises a rectangular box-shaped frame 1 formed of a pair of longitudinal cross rails 1a connected by side rails 1b. The side rails project forwardly from the front of the machine in converging relation to provide a triangular-shaped draft member 2 by which the machine may be hitched to a tractor.

Journaled in bearings 3 fastened to the underside of the side rails 1b are trunnions 4, which latter project centrally outwardly from a pair of circular end plates 5. These end plates constitute opposite ends of a rotor R which is enclosed by the box frame 1 and is adapted to either roll or slide upon the ground. The rotor also comprises a series of four radially disposed web plates 6 fastened to and extending between the end plates 5, these web plates being equidistantly-spaced apart angularly about the rotor. The outer longitudinal edges of the web plates terminate approximately even with the periphery of the end plates. Mounted upon the outer edges of the web plates 6 and coextensive therewith are scraper blades 7, while angle irons 9 located upon opposite sides of the web plates from the scraper blades serve to stiffen and strengthen the outer marginal edges of the web plates. The scraper blades project a short distance outwardly beyond the web plates and are secured to the web plates by bolts 8 which pass through registering holes in the web plates, the scraper blades and the angle irons. Plates 6 and scrapers 7 together may be considered to comprise web plates which extend from the axis of the rotor and project slightly beyond the outer peripheries of the end plates 5.

Attached to and projecting outboard rearwardly of the box frame 1 is a pair of truss frames 10, one at each side of the machine. The truss frames at their outer ends located beyond the rear cross rail 1a are journaled to support a rock shaft 11 extending crosswise of the machine and generally parallel to the box frame 1. The rock shaft has secured thereto adjacent its opposite ends two struts 12 which project downwardly toward the ground, and each strut has mounted upon its lower end a pneumatically-tired wheel 13. The rock shaft 11 may be rotated through an arc to swing the wheels 13 into and out of contact with the ground, so that when the wheels are lowered the rotor is raised a short distance off the ground. For actuating the rock shaft there is provided a hydraulic jack 14. The cylinder of this jack is pivotally secured to the box frame 1 and has the outer end of its piston rod 15 pivotally connected to a lever 16 fixed to the rock shaft. Fluid may be admitted to and exhausted from the jack via the lines 18 and 18a leading from a source of pressure on the tractor. A seat 17, adapted to be occupied by the machine operator, is supported on the box frame rearwardly of the rotor.

A cross-rod 20 journaled in bearings 21 on the box frame 1 extends adjacent and parallel to the cross rail 1a of the box frame. Fixed to each end of this cross-rod is a pair of parallel, relatively closely spaced trip arms 22, and between each pair of trip arms at their outer ends is a roller 23 which normally is disposed in the vicinity of the periphery of one of the end plates 5, so that by rotating the cross-rod 20, by means of a hand lever 24 fixed to the cross-rod in the vicinity of the seat 17, the rollers 23 may be oscillated either in a clockwise or an anti-clockwise direction. A stop 22a is preferably suitably provided so as to engage and limit the forward or clockwise movement of the trip arms 22.

The end plates each have secured to their peripheries four lugs 26, these lugs being so located relative to the trip arms that during rotation of the rotor with the lever pushed forward into trip position, companion lugs on the two end plates will ride into the spaces between the pairs of trip arms and abut the rollers, thus locking the rotor against rotation. The relationship of the lugs to the web plates 6 is such that when any corresponding pair of lugs on the two end plates is engaged by the rollers 23, rotation of the rotor will be arrested with one of the web plates disposed approximately vertically with its scraper blade in scraping contact with the ground.

The operation of the furrowing and ridging machine just described is as follows: The machine is adapted to be attached as a trailer to a tractor by means of the draft member 2 and, with the wheels 13 lowered so as to maintain the rotor R out of contact with the ground, the machine is hauled by the tractor over the highway or across the field to the place where it is to be used. Then to place the machine in service, the tractor operator actuates the hydraulic jack 14 to swing the wheels upwardly to allow the machine to lower with the rotor resting on the ground.

The machine, with the operator occupying the seat 17, is drawn by the tractor in a path parallel to the irrigation ditch and across the stretch of ground located between the irrigation ditch and the ends of the irrigation channels previously formed by the cultivator. The operator by shifting the hand lever 24 back and forth causes the trip arms 22 attached to the rock shaft 20 to be moved into and out of the paths of travel of the lugs 26 on the end plates 5. When, for example, the hand lever 24 is pushed forward the pairs of trip arms carrying the rollers 23 are moved so that corresponding lugs upon opposite end plates ride into the spaces between the pairs of trip arms and are intercepted by the rollers. The rotor R is thereupon held against rotation with one of the web plates 6 disposed perpendicular to the ground. Thereafter the machine is dragged by the tractor, causing a small mound of earth to be piled up by the scraper blade 7 of the perpendicularly-disposed web plate. The operator now pulls upon the hand lever 24 to swing the trip arms anti-clockwise, releasing the rollers from engagement with the lugs 26 and allowing rotation of the rotor. As the rotor rotates upon the ground, it dumps the accumulated material, as shown in Fig. 3.

In this way the previously formed irrigation channels are extended up to the edge of the irrigation ditch where water is siphoned from the irrigation ditch into the channels which distribute it across the field under cultivation.

By making the end plates 5 approximately 20 inches in diameter (which more or less represents the smallest practicable size of rotor) the chordal distance between the four web plates 6 at their outer longitudinal edges is approximately 14 inches. Consequently, the rotor travels about 14 inches before the trip arms 22 engage a pair of lugs 26 and lock the rotor; and if dumps are being made every 38 inches—which is the usual spacing between rows of cotton—the rotor will be held stationary during the travel of the machine for about two feet during the scraping action in which dirt is collected for the succeeding dump. It is apparent, therefore, that by providing the rotor with a less number of web plates than four would result in increasing the distance between the furrows, and hence the furrows so produced would not match the spacing between the channels produced by the cultivator.

An advantageous feature of construction resides in the mechanism for tripping the rotor, namely the companion pairs of trip arms 22 each carrying the roller 23. A roller when the hand lever 24 is shifted forwardly is adapted to occupy a position within the path of travel of the lugs 26 on an end plate 5 so that when a lug 26 on the end plate passes into the space between a pair of trip arms it is caught and held by the roller and when the trip arms are released the roller easily rides off the lug. This construction avoids imparting excessive shock or wear to the machine.

While I have described the furrowing and ridging machine as drawn by a tractor this is merely by way of example. The machine may, if desired, be modified so as to be horse drawn, self-propelled or form accessorial equipment for direct attachment to a tractor. Likewise the seat 17 may be omitted from the machine, in which case the means for actuating the rock shaft 11 will be mounted upon the tractor for operation by the driver of the tractor. The means for actuating the rock shaft need not be a hydraulic jack mechanism as suggested in the foregoing description but may be any conventional jacking mechanisms for raising and lowering the wheels of farm machinery, such for example as a nut and screw shaft mechanism.

Many forms and applications of this invention will occur to those skilled in the art, and therefore it should be clearly understood that I am not to be limited in my invention to the preferred form shown and described but by the scope of the following claim.

I claim:

A furrowing and ridging machine having a frame comprising a pair of longitudinally-extending side rails, a seat supported upon the frame, a rotor journaled on and disposed between the side rails, said rotor comprising two circular end plates and four radially-disposed, equidistantly-spaced web plates extending between and fixedly secured at their opposite ends to the end plates, the inner edges of the web plates terminating adjacent the axis of the rotor and their outer edges projecting slightly beyond the peripheral edges of the end plates, means for locking the rotor against rotation, said locking means comprising a series of lugs secured to the end plates adjacent their peripheries and projecting beyond the peripheries of the end plates at angularly spaced intervals about the end plates, a rock-shaft supported upon the frame, a hand lever for oscillating the rock-shaft, pairs of trip arms secured to the rock-shaft, each pair of trip arms being disposed in planes closely adjacent opposite sides of the lugs, and a roller extending between the outer ends of each pair of trip arms adjacent the peripheries of the end plates, whereby when the rock-shaft is oscillated in one direction the roller is moved into the path of the lugs to arrest rotation of the rotor, a pair of wheels pivotally supported outboard at the trailing end of the frame, and a jack for swinging said wheels into and out of contact with the ground to raise or lower the rotor off of or onto the ground.

References Cited in the file of this patent

UNITED STATES PATENTS

| Number | Name | Date |
| --- | --- | --- |
| 747,536 | Caton | Dec. 22, 1903 |
| 828,575 | Schilling | Aug. 14, 1906 |
| 1,539,207 | Ranker | May 26, 1925 |
| 1,793,242 | Neufang | Feb. 17, 1931 |
| 1,893,131 | Council et al. | Jan. 3, 1933 |
| 2,022,757 | Buffington | Dec. 31, 1935 |
| 2,146,757 | Nordman et al. | Feb. 14, 1939 |
| 2,392,006 | Silver | Jan. 1, 1946 |
| 2,534,972 | Hume | Dec. 19, 1950 |
| 2,622,501 | Bennett | Dec. 23, 1952 |
| 2,648,922 | Kitchen | Aug. 18, 1953 |
| 2,713,219 | Gerrans | July 19, 1955 |